United States Patent
Yoshino

(10) Patent No.: US 12,254,286 B2
(45) Date of Patent: Mar. 18, 2025

(54) RANDOM NUMBER SUPPLY METHOD AND DEVICE

(71) Applicant: NEC Corporation, Tokyo (JP)

(72) Inventor: Ken-ichiro Yoshino, Tokyo (JP)

(73) Assignee: NEC CORPORATION, Tokyo (JP)

(*) Notice: Subject to any disclaimer, the term of this patent is extended or adjusted under 35 U.S.C. 154(b) by 953 days.

(21) Appl. No.: 17/312,137

(22) PCT Filed: Dec. 12, 2018

(86) PCT No.: PCT/JP2018/045741
§ 371 (c)(1),
(2) Date: Jun. 9, 2021

(87) PCT Pub. No.: WO2020/121451
PCT Pub. Date: Jun. 18, 2020

(65) Prior Publication Data
US 2022/0043633 A1     Feb. 10, 2022

(51) Int. Cl.
*G06F 7/58*     (2006.01)

(52) U.S. Cl.
CPC ..................... *G06F 7/58* (2013.01)

(58) Field of Classification Search
CPC ... G06F 7/58–588; H04L 9/12; H04L 9/0858; H04L 9/0852; H04L 9/0855; H04L 9/00
See application file for complete search history.

(56) References Cited

U.S. PATENT DOCUMENTS

| | | | |
|---|---|---|---|
| 4,408,298 A | 10/1983 | Ruhland | |
| 5,966,313 A * | 10/1999 | Sakamoto | G06F 7/58 |
| | | | 708/250 |
| 2005/0157875 A1 | 7/2005 | Nishioka et al. | |
| 2006/0280509 A1 * | 12/2006 | Tomaru | H04L 9/0858 |
| | | | 398/188 |
| 2011/0311050 A1 * | 12/2011 | Tomaru | H04L 10/70 |
| | | | 380/256 |
| 2020/0067704 A1 * | 2/2020 | Zbinden | H04B 10/07953 |

FOREIGN PATENT DOCUMENTS

| | | |
|---|---|---|
| JP | S61193183 A | 8/1986 |
| JP | 2010233123 A | 10/2010 |
| WO | 2004030270 A1 | 4/2004 |

OTHER PUBLICATIONS

International Search Report of PCT Application No. PCT/JP2018/045741 mailed Mar. 19, 2019.

* cited by examiner

*Primary Examiner* — Andrew Caldwell
*Assistant Examiner* — Carlo Waje
(74) *Attorney, Agent, or Firm* — Sughrue Mion, PLLC

(57) ABSTRACT

A random number supply device that generates three states required for operation of a signal processing unit from two-bit random number, includes a decision section decides whether a first random number generated by a first random number generator matches a predetermined value, and a control section supplies the signal processing unit with two-bit random number including the first random number by not using a second random number generated by a second random number generator when the first random number matches the predetermined value, and by using the second random number when the first random number does not match the predetermined value.

12 Claims, 11 Drawing Sheets

FIRST ILLUSTATIVE EMBODIMENT

FIG. 5
THIRD ILLUSTRATIVE EMBODIMENT $n = 3$

| RN1 | RN2 | RN3 | $5(=2^3-3)$ STATES, DESIGNATED VALUE "1" | $6(=2^3-2)$ STATES, DESIGNATED VALUES "10", "11" | $7(=2^3-1)$ STATES, DESIGNATED VALUE "11" |
|---|---|---|---|---|---|
| 0 | 0 | 0 | 1 | 1 | 1 |
| 0 | 0 | 1 | 2 | 2 | 2 |
| 0 | 1 | 0 | 3 | 3 | 3 |
| 0 | 1 | 1 | 4 | 4 | 4 |
| 1 | 0 | 0 | 5 | 5 | 5 |
| 1 | 0 | 1 | 5 | 5 | 5 |
| 1 | 1 | 0 | 5 | 6 | 6 |
| 1 | 1 | 1 | 5 | 6 | 7 |

FIG. 11

| RANDOM NUMBER SUPPLY | | | INTENSITY MODULATOR 802 DRIVING | | DECOY INTENSITY MODULATION | | |
|---|---|---|---|---|---|---|---|
| OUTPUT O1 | OUTPUT O2 | STATE | $\Phi_1$ | $\Phi_2$ | TYPE | INTENSITY RATIO | MIXING RATIO |
| 1 | x | S1 | 0 | 0 | μ (SIGNAL LIGHT) | 1 (REFERENCE) | 90% |
| 0 | RN2 1 | S2 | θ | 0 | μ' (DECOY) | 0.4 | 6% |
| 0 | RN2 0 | S3 | 0 | 180 | 0 (VACUUM) | 0 | 4% |

RANDOM NUMBER SUPPLY METHOD AND DEVICE

This application is a National Stage Entry of PCT/JP2018/045741 filed on Dec. 12, 2018, the contents of all of which are incorporated herein by reference, in their entirety.

TECHNICAL FIELD

The present invention relates to a method and apparatus for supplying random numbers to a signal processing device which uses random numbers.

BACKGROUND

Recently, with the increasing speed and capacity of communication networks, the amount of random number needed for data encryption or the like is becoming greater. In particular, random numbers for encryption key should not be predictable in advance. Accordingly, it is desirable that the random numbers be true random numbers rather than pseudo-random numbers. As a source of true random numbers, physical random number generators using thermal noise and photon detection are commercially available, but their speed is limited to the order of a few Mega Hz. This makes it difficult to secure a sufficient amount of random number to support high-speed systems where the system clock exceeds several GHz. Therefore, various proposals have been made to reduce the consumption of random numbers on the side using random numbers.

For instance, in a quantum key distribution (QKD) system, a transmitter (Alice) modulates optical pulses using random numbers of key information and random numbers of basis information. Actually, a receiver (Bob) detects photons at a very low probability (about 1/1000). Considering this physical property of photon transmission, the random number consumption required for basis modulation can be reduced by changing the basis modulation at each predetermined bit block instead of bit by bit (see PTL1).

BACKGROUND ART LITERATURE

Patent Literature

[PTL1] JP2010-233123

SUMMARY

Technical Problem

In the above-mentioned PTL1, the physical property of the QKD system that the receiver detects photons at a very low probability is used to save the consumption of random numbers. It goes without saying that further random number saving is desirable.

Taking a decoy QKD system as an example, a transmitter (Alice) needs two sequences of binary random numbers to generate three different light intensities. The two sequences of binary random numbers can be used to generate four states. However, the decoy system selects three out of the four states. Thus, in signal processing, there may be some unused states among the logical number of states. The inventors found that it is possible to reduce the consumption of random numbers by focusing on such unused states in signal processing. In generalization, assuming that signal processing uses only the number of states greater than $2^{n-1}$ and less than $2^n$ among $2^n$ states, where n is an integer greater than or equal to 2, the consumption of random numbers can be reduced by focusing on the unused states.

An object of the present invention is to provide a random number supplying method and device that can reduce the consumption of random numbers supplied to a signal processing unit.

Solution to Problem

According to a first aspect of the present invention, a random number supply device that generates three states required for operation of a signal processing unit from two-bit random number, includes: a decision section configured to decide whether a first random number matches a predetermined value, the first random number is generated by a first random number generator; and a control section configured to supply the signal processing unit with the two-bit random number including the first random number by not using a second random number generated by a second random number generator when the first random number matches the predetermined value, and by using the second random number when the first random number does not match the predetermined value.

According to a second aspect of the present invention, a random number supply device that supplies a n-bit random number to a signal processing unit that operates according to the n-bit random number (n is an integer equal to or greater than 2), includes: a memory unit that stores random numbers generated by at least one random number generator; a decision section configured to decide whether at least one random number read from the memory unit matches at least one predetermined value; and a control section configured to: when the at least one random number matches the at least one predetermined value, supply the signal processing unit with n-bit random number consisting of the at least one random number and an arbitrary value stored at remaining bit positions following the at least one random number; and when the at least one random number does not match the at least one predetermined value, supply the signal processing unit with n-bit random number consisting of matched random numbers of the at least one random number and further random numbers read from the memory stored at bit positions from a mismatch bit position on down.

According to a third aspect of the present invention, a random number supply method that generates three states required for operation of a signal processing unit from two-bit random number, includes: by a decision section, deciding whether a first random number matches a predetermined value, the first random number is generated by a first random number generator; and by a control section, supplying the signal processing unit with the two-bit random number including the first random number by not using a second random number generated by a second random number generator when the first random number matches the predetermined value, and by using the second random number when the first random number does not match the predetermined value.

According to a fourth aspect of the present invention, a random number supply method for supplying a n-bit random number to a signal processing unit that operates according to the n-bit random number (n is an integer equal to or greater than 2), includes: storing random numbers generated by at least one random number generator in a memory unit; by a decision section, deciding whether at least one random number read from the memory unit matches at least one predetermined value; and by a control section, when the at least one random number matches the at least one predetermined value, supplying the signal processing unit with n-bit random number consisting of the at least one random number and an arbitrary value stored at remaining bit positions following the at least one random number; and when the at least one random number does not match the at least one predetermined value, supplying the signal processing unit with n-bit random number consisting of matched random numbers of the at least one random number and further random numbers read from the memory stored at bit positions from a mismatch bit position on down.

According to a fifth aspect of the present invention, a program for functioning a computer as a device for supplying a random number to a signal processing unit that operates according to the random numbers, the program implementing functions of: deciding whether a first random number matches a predetermined value, the first random number is generated by a first random number generator; and supplying the signal processing unit with the two-bit random number including the first random number by not using a second random number generated by a second random number generator when the first random number matches the predetermined value, and by using the second random number when the first random number does not match the predetermined value.

According to a sixth aspect of the present invention, a program for functioning a computer as a device for supplying n-bit (n is an integer equal to or greater than 2) random number to a signal processing unit that operates according to the n-bit random numbers, the program implementing functions of: storing random numbers generated by at least one random number generator in a memory unit; deciding whether at least one random number read from the memory unit matches at least one predetermined value; and when the at least one random number matches the at least one predetermined value, supplying the signal processing unit with n-bit random number consisting of the at least one random number and an arbitrary value stored at remaining bit positions following the at least one random number; and when the at least one random number does not match the at least one predetermined value, supplying the signal processing unit with n-bit random number consisting of matched random numbers of the at least one random number and further random numbers read from the memory stored at bit positions from a mismatch bit position on down.

Advantageous Effects of the Invention

According to the present invention, the consumption of random numbers supplied to the signal processing unit can be reduced by determining the value of a random number and determining whether to use the next random number according to the value of the random number.

BRIEF DESCRIPTION OF THE DRAWINGS

FIG. 5 is a diagram illustrating a state count table for explaining a fundamental principle of a random number supplying method according to a third illustrative embodiment of the present invention.

FIG. 11 is a schematic diagram of operations illustrating an example of the relationship among the random number supply, the drive of an intensity modulator, and the decoy intensity modulation in a transmitter (Alice) using the random number supply device according to the first illustrative embodiment of the present invention.

EMBODIMENTS OF INVENTION

Outline of Illustrative Embodiments

According to illustrative embodiments of the present invention, in the case of generating three states required for signal processing by using two random numbers, if the value of a first random number is a predetermined value, a second random number following the first random number is not used, and if the value of the first random number is not the predetermined value, the second random number is used. This method allows three states used for signal processing to be generated out of four states logically obtained by two sequences of random numbers. Since the second random number is not used if the first random number is the predetermined value, the overall consumption of random numbers can be reduced. This method can also be applied to the cases of three or more sequences of binary random numbers, as described below.

Illustrative embodiments of the present invention are described in detail below with reference to the drawings. However, components described in the following illustrative embodiments are merely examples and are not intended to limit the technical scope of the present invention to them.

1. FIRST ILLUSTRATIVE EMBODIMENT

According to the first illustrative embodiment of the invention, it is decided whether a first random number generated by a first random number generator is a predetermined value. If it is the predetermined value, a second random number generated by a second random number generator is not used, and if it is not the predetermined value, the second random number is used. Accordingly, if the first random number is the predetermined value, no random number is consumed, thus as a whole reducing consumption of random numbers. Since the second random number consumes less than the first random number, the second random number generator can operate at a speed lower than the first random number generator. Taking a binary a/b random number as an example, the first illustrative embodiment will be explained below. Note that if one of a and b is 0, the other takes the value of 1.

Figure 1:
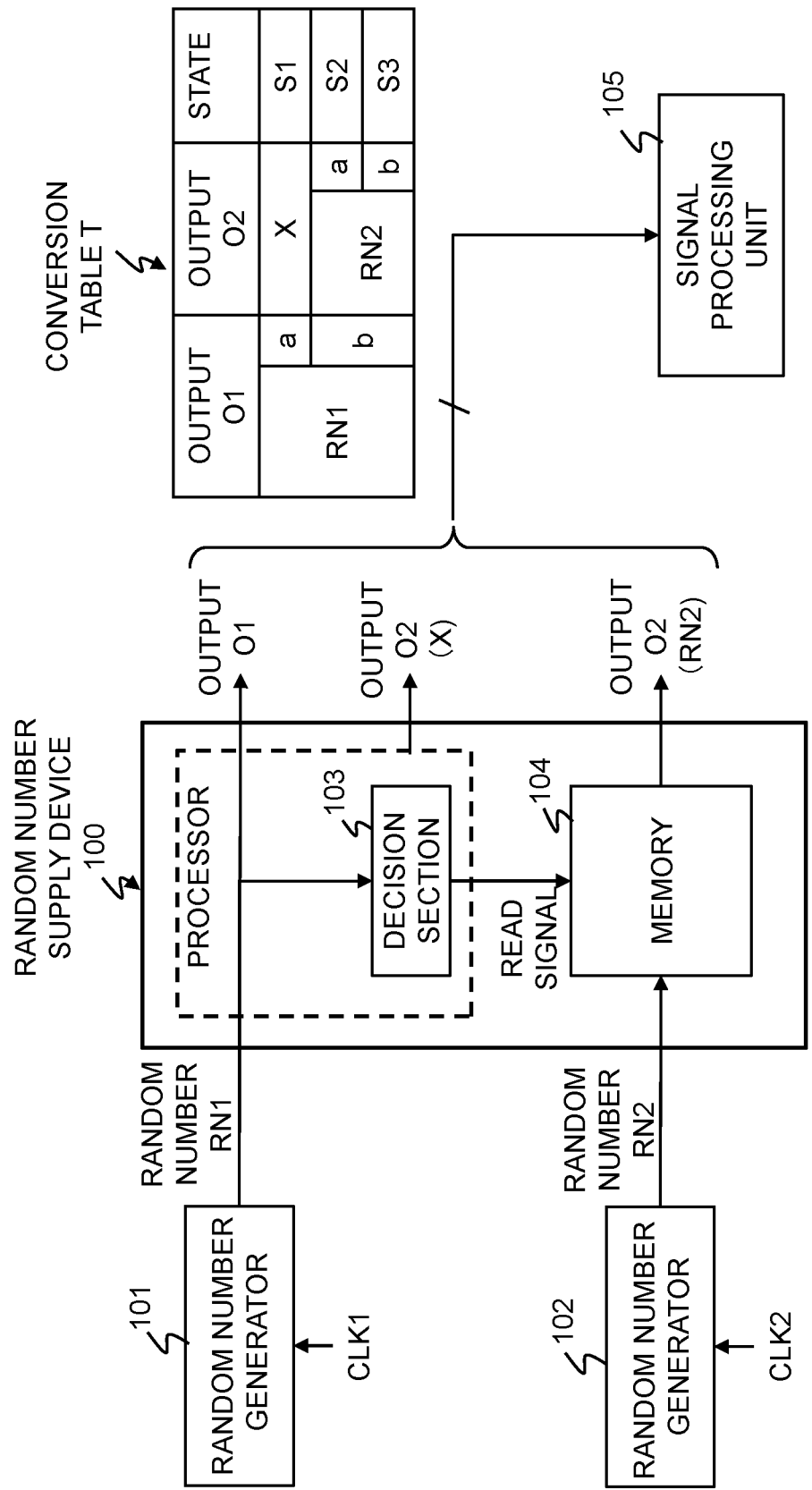
FIG. 1 is a block diagram illustrating a schematic configuration of a random number supplying device according to a first illustrative embodiment of the present invention.

As illustrated in FIG. 1, a random number supply device 100 according to the first illustrative embodiment inputs two sequences of random numbers, RN1 and RN2, from the random number generator 101 and the random number generator 102, respectively, and outputs O1 and O2 for indicating three states. The random number supply device 100 includes a decision section 103 and a memory 104. The random number supply device 100 may have two systems of random number generators 101 and 102 inside. The random number generator 101 generates the random number RN1 according to clock CLK1. The random number generator 102 generates the random number RN2 according to clock CLK2 having a clock speed lower than the clock CLK1. Although it is desirable that the random number generators 101 and 102 are hardware random number generators using thermal noise, photon detection, etc., the present illustrative embodiment may be also applicable to the case of pseudo-random number generators.

The random number RN1 generated by the random number generator 101 is output as output O1 of the random number supply device 100 and is entered into the decision section 103. The random number RN2 generated by the random number generator 102 is sequentially stored in the memory 104 and is sequentially read out from the top in response to the read signal.

The decision section 103 decides whether RN1 is a predetermined value (here, the predetermined value a). If RN1 is the predetermined value a, the decision section 103 does not output the read signal to the memory 104 but can output a value other than a random number (a predetermined, fixed value or Don't-Care bit) as output O2 to the signal processing unit 105. Hereinafter, the predetermined, fixed value or Don't-Care bit of the output O2 shall be denoted as "X". In other words, for the signal processing unit 105, if output O1=a, the signal processing function is determined and the value of output O2 has no effect.

If RN1 is a value other than the predetermined value (here the value is b), the decision section 103 outputs the read signal to the memory 104. The memory 104, each time the read signal is input, sequentially reads the accumulated random numbers RN2 from the top and outputs them as output O2 of the random number supply device 100. The read random numbers RN2 are sequentially deleted from the memory 104. In this embodiment, the memory 104 does not read the accumulated random numbers when inputting no read signal. Instead of the decision section 103 outputting X, the processor including the decision section 103 or the memory 104 may output O2 as X at the timing of the output O1.

As described above, the random number supply device 100 can generate three states S1, S2, and S3 depending on outputs O1 and O2 and output them to the signal processing unit 105, as illustrated in a conversion table T in FIG. 1. In other words, when RN1=O1=a, state S1 can be indicated regardless of the value of O2, and when RN1=O1=b, state S2 can be indicated if RN2=O2=a, and state S3 can be indicated if RN2=O2=b. The signal processing unit 105 executes signal processing according to any of the states S1 to S3 identified by the outputs O1 and O2 of the random number supply device 100, depending on the state concerned. In particular, the signal processing unit 105 always executes the signal processing according to the state S1 if the value of the output O1 is a.

In the configuration illustrated in FIG. 1, the random number RN1 input from the random number generator 101 is output as output O1. Alternatively, the random number RN1 may be temporarily stored in a memory (not shown). In other words, the random number supply device 100 may be configured to have a first memory for storing the random number RN1 and a second memory (the memory 104 mentioned above) for storing the random number RN2. The random number RN1 stored in the first memory may be read according to the clock of the random number supply device 100 and is subjected to decision by the decision section 103.

The functions of the random number supply device 100 can be realized by hardware of the decision unit 103 and the memory 104, or by hardware of a processor having the functions of the decision section 103 and the memory 104. Alternatively, the functions shown in the conversion table T can be implemented by software executing programs on the processor. Next, with reference to FIG. 2, the case will be described where the processor reads the random number supply control program from the memory and executes the program.

Figure 2:
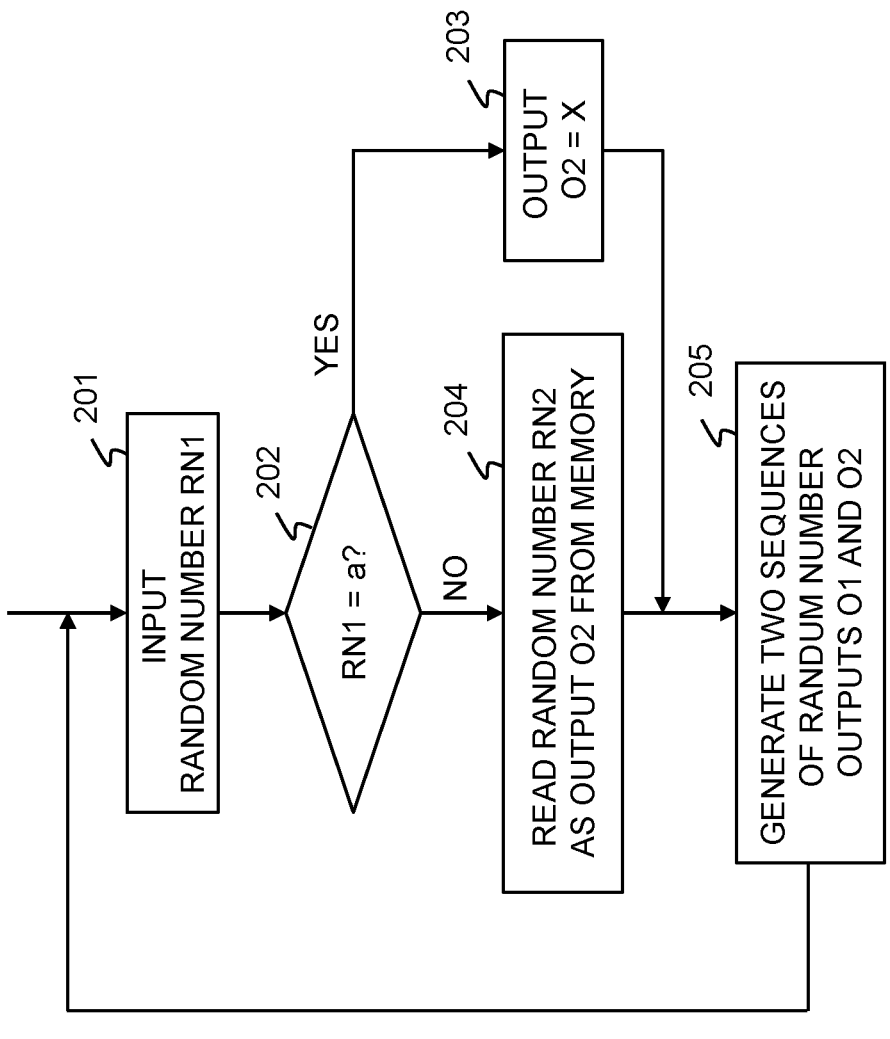
FIG. 2 is a flowchart illustrating operations of the random number supplying device according to the first illustrative embodiment of the present invention.

As illustrated in FIG. 2, the processor, when inputting a single random number RN1 from the random number generator 101 (Operation 201), decides whether the RN1 is equal to a predetermined value a (Operation 202; operation of the decision section 103). If the value of RN1 is equal to the value a (YES in operation 202), the processor sets the output O2 to X (Operation 203). If the value of RN1 is not the value a (NO in Operation 202), the processor reads the stored random number RN2 as output O2 from the memory 104 (Operation 204). Thus, the processor outputs the RN1 input from the random number generator 101 and the RN2 or X read from the memory 104 as output O1 and output O2, respectively (Operation 205). By sequentially inputting the random numbers RN1 according to the clock CLK1 and repeating the above operations 201 to 205, the processor can supply the signal processing unit 105 with two sequences of random numbers for randomly selecting the three states S1 to S3.

As described above, according to the first illustrative embodiment of the present invention, it is decided whether the random number RN1 is the predetermined value, and if RN1 is the predetermined value, then the random number stored in the memory 104 is not consumed. If RN1 is not the predetermined value, then the random number RN2 stored in the memory 104 is used. In this manner, the random number RN1 and the stored random number RN2 are output to the signal processing unit 105 as random numbers O1 and O2 for signal processing. If RN1 is the predetermined value, the random number RN2 stored in the memory 104 is not used, enabling reductions in consumption of the stored random number RN2 in the memory 104. Accordingly, the random number generator 102 having an operation speed lower than the random number generator 101 can be used to generate the random number RN2.

2. SECOND ILLUSTRATIVE EMBODIMENT

According to the second embodiment of the present invention, it is possible to generate three states similar to the first illustrated embodiment by pooling random numbers generated by a random number generator in a memory and controlling the reading of random numbers from the random number pool. That is, it is decided whether the value of a first random number read from the random number pool is a predetermined value. If it is the predetermined value, no random number is read from the random number pool, and if it is not the predetermined value, a second random number is read from the random number pool. Accordingly, if the first random number is the predetermined value, no random numbers are consumed, thus reducing the amount of consumed random number. Taking a binary a/b random number as an example, the second illustrative embodiment will be explained below. Note that if one of a and b is 0, the other takes the value of 1.

Figure 3:
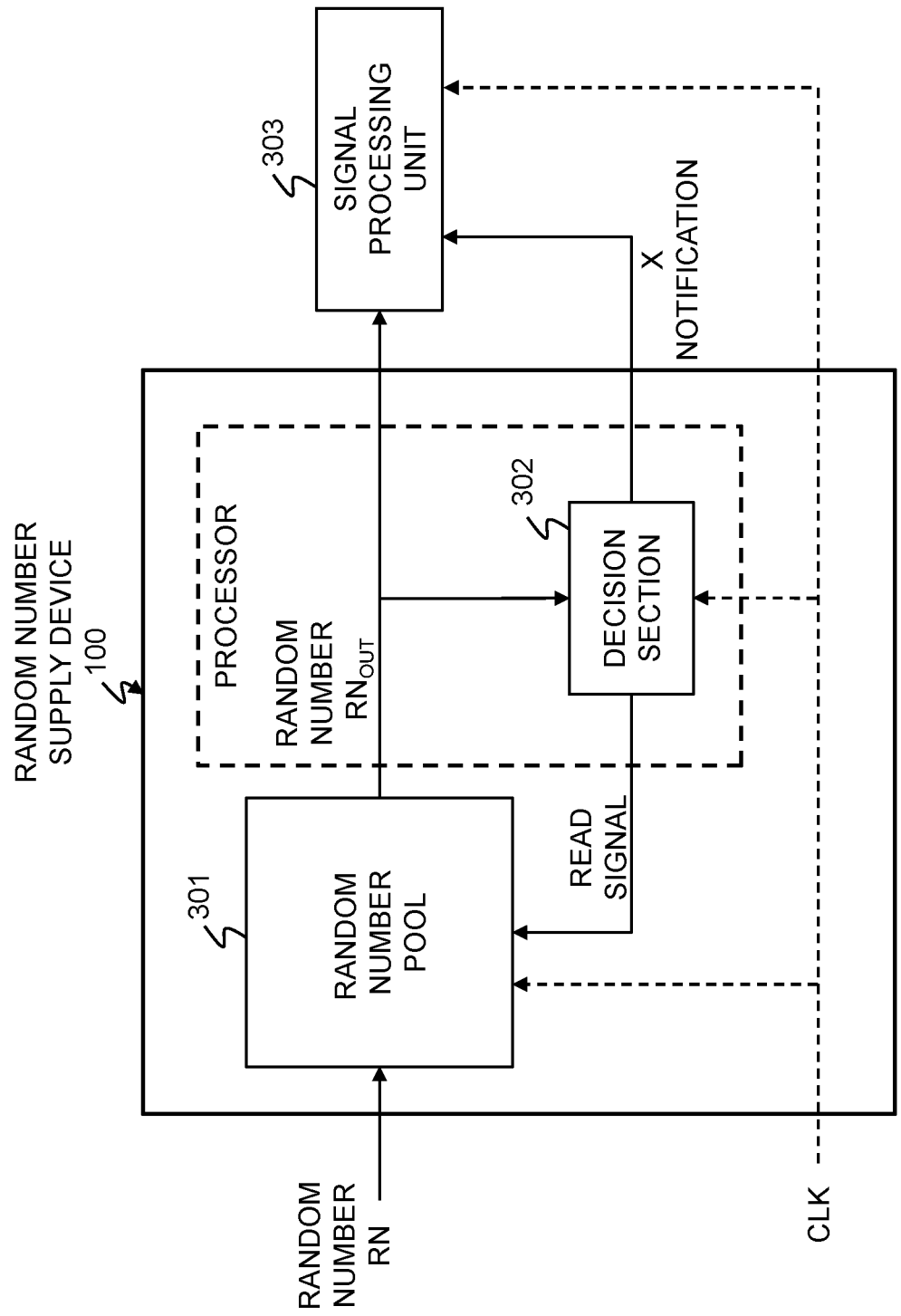
FIG. 3 is a block diagram illustrating a schematic configuration of a random number supplying device according to a second illustrative embodiment of the present invention.

As illustrated in FIG. 3, a random number supply device 100 according to the second illustrative embodiment inputs random numbers RN from one or more random number generators and stores them in a random number pool 301 provided within a memory. The random number generator is preferably a hardware random number generator using thermal noise, photon detection, or the like. However, the present embodiment is applicable even to the case of a pseudo-random number generator. The random number pool 301 is subjected to read control by a control section functioning as a decision section 302, and outputs random number $RN_{OUT}$ to a signal processing unit 303, which identifies one of the three states according to the random number $RN_{OUT}$. It is assumed that the random number pool 301, the decision section 302, and the signal processing unit 303 operate according to clock CLK.

When a random number RN1 is read from the random number pool 301, the decision section 302 decides whether the value of the input random number RN1 is a predetermined value a. If RN1=a, the decision section 302 sends an X notification indicating Don't Care to the signal processing unit 303. If RN1 is a value b other than a, the decision section 302 outputs a read signal to the random number pool 301. The random number pool 301, each time inputting the read signal, sequentially reads random numbers RN2 while deleting the read RN2. Thus, only a set of RN1 and RN2 following RN1 or RN1 with X notification is output as random number $RN_{OUT}$ to the signal processing unit 303.

Therefore, as in the case of the conversion table T illustrated in FIG. 1, the random number supply device 100 can generate three states S1, S2, and S3 by using the random number $RN_{OUT}$ instead of the outputs O1 and O2. In other words, when RN1=a, state S1 is indicated unconditionally, when RN1=b, state S2 is indicated if the subsequent random number RN2=a, and state S3 is indicated if RN2=b.

The functions of the random number supply device 100 illustrated in FIG. 3 can be implemented by hardware such as a memory of the random number pool 301 and the decision section 302. Alternatively, the same functions can be implemented by executing programs on a processor. Hereinafter, referring to FIG. 4, the case where the processor reads and execute a random number supply control program from the memory will be described.

Figure 4:
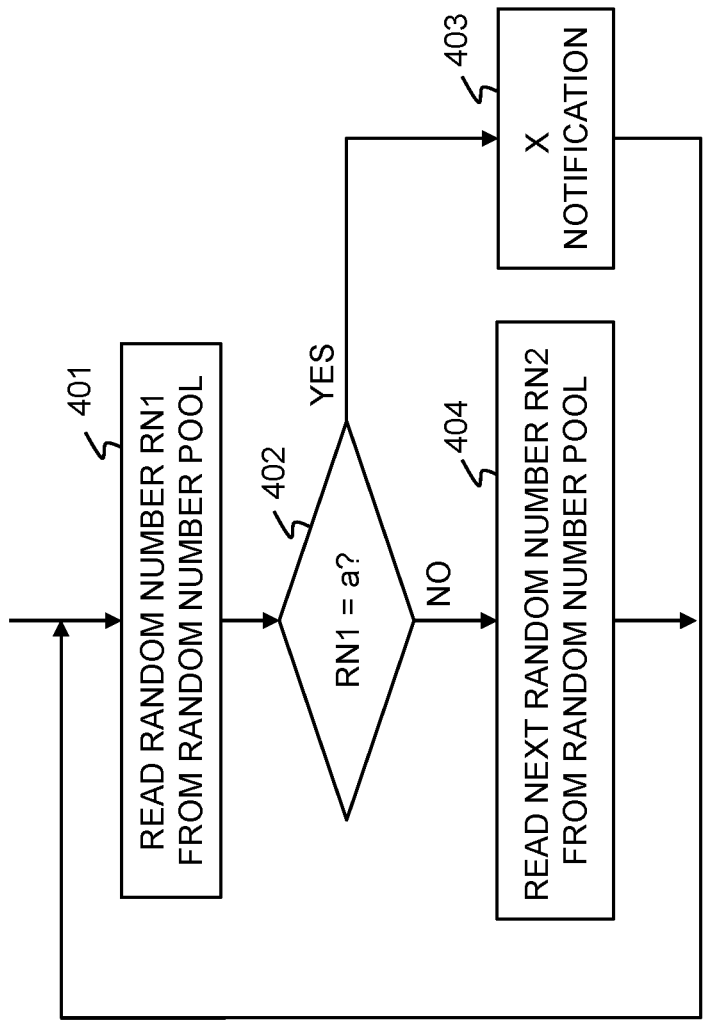
FIG. 4 is a flowchart illustrating operations of the random number supplying device according to the second illustrative embodiment of the present invention.

As illustrated in FIG. 4, the processor reads a random number RN1 from the random number pool 301 (Operation 401) and decides whether the value of the random number RN1 is a predetermined value a (Operation 402). The random number RN1 is output as a random number $RN_{OUT}$ to the signal processing unit 303. Then, if RN1=a (YES in Operation 402), the processor sends an X notification indicating Don't Care to the signal processing unit 303 so as to indicate that there is no random number following the RN1 (Operation 403). If RN1 is a value b other than a (NO in Operation 402), the processor reads a random number RN2 following the random number RN1 from the random number pool 301 and outputs it to the signal processor 303 (Operation 404). The read random number RN2 is deleted from the random number pool 301.

Thus, if RN1=b, the state S2 or S3 is determined depending on the value of RN2 that follows RN1 and is notified to the signal processing unit 303. If RN1=a, an X notification indicating that there is no random number that follows it is output to the signal processing unit 303. The signal processing unit 303, when receiving the X notification, executes the signal processing for the state S1 identified by O1=RN1=a and O2=RN2=X in the conversion table T shown in FIG. 1. By repeating the above operations 401 to 404 according to the clock CLK, the processor can supply the signal processing section 303 with a random number sequence that randomly selects the three states S1 to S3.

As described above, according to the second illustrative embodiment of the present invention, if the random number RN1 read from the random number pool 301 is the predetermined value, the subsequent random number RN2 is not read from the random number pool 301. If the random number RN1 is not the predetermined value, the subsequent random number RN2 is read from the random number pool 301. This reduces the amount of consumed random number in the random number pool because the random number RN2 is consumed only when the random number RN1 is not the predetermined value.

3. THIRD ILLUSTRATIVE EMBODIMENT

According to the third illustrative embodiment of the present invention, the number of logical states, 4 ($=2^2$), in the first and second illustrative embodiments is generalized to $2^n$ states (n is an integer greater than or equal to 2), and random numbers are supplied to signal processing that uses only the number of states greater than $2^{n-1}$ and smaller than $2^n$ out of the $2^n$ states. In this method, the consumption of random numbers can be saved by focusing on the unused states. The basic method of the present embodiment will be briefly explained with reference to FIG. 5.

A table shown in FIG. 5 illustrates eight logical states generated by the random number supply device 100 when n=3. According to the present embodiment, a set of RN1, RN2 and RN3 is regarded as a 3-bit binary number. By comparing the first 1 bit (RN1) or the first 2 bits (RN1, RN2) to a designated value, the consumption of random numbers in unused states can be avoided. For example, by using "1" as the designated value for the first 1 bit, 5 ($=2^3-3$) states can be generated. By using "10" or more as the designated value for the first 2 bits, i.e. the designated values of "10" and "11", 6 ($=2^3-2$) states can be generated. By using "11" as the designated value for the first 2 bit, 7 ($=2^3-1$) states can be generated. In the case of n=4 or more, a desired number of states greater than $2^{n-1}$ and smaller than $2^n$ can be easily generated by setting multiple designated values greater than or equal to n-bit value RN1 . . . RNn corresponding to the desired number of states.

In the following, an integer m greater than 0 and smaller than n (an integer of 2 or more) is used to denote a m-bit designated value as "b1 . . . bm". For example, in the case of n=3 shown in FIG. 5, if the number of designated states is 6, the corresponding most significant 2-bit designated value "b1b2" is "10". Accordingly, it is sufficient to set the designated value "10" and the larger designated value "11".

3.1) Configuration

Figure 6:
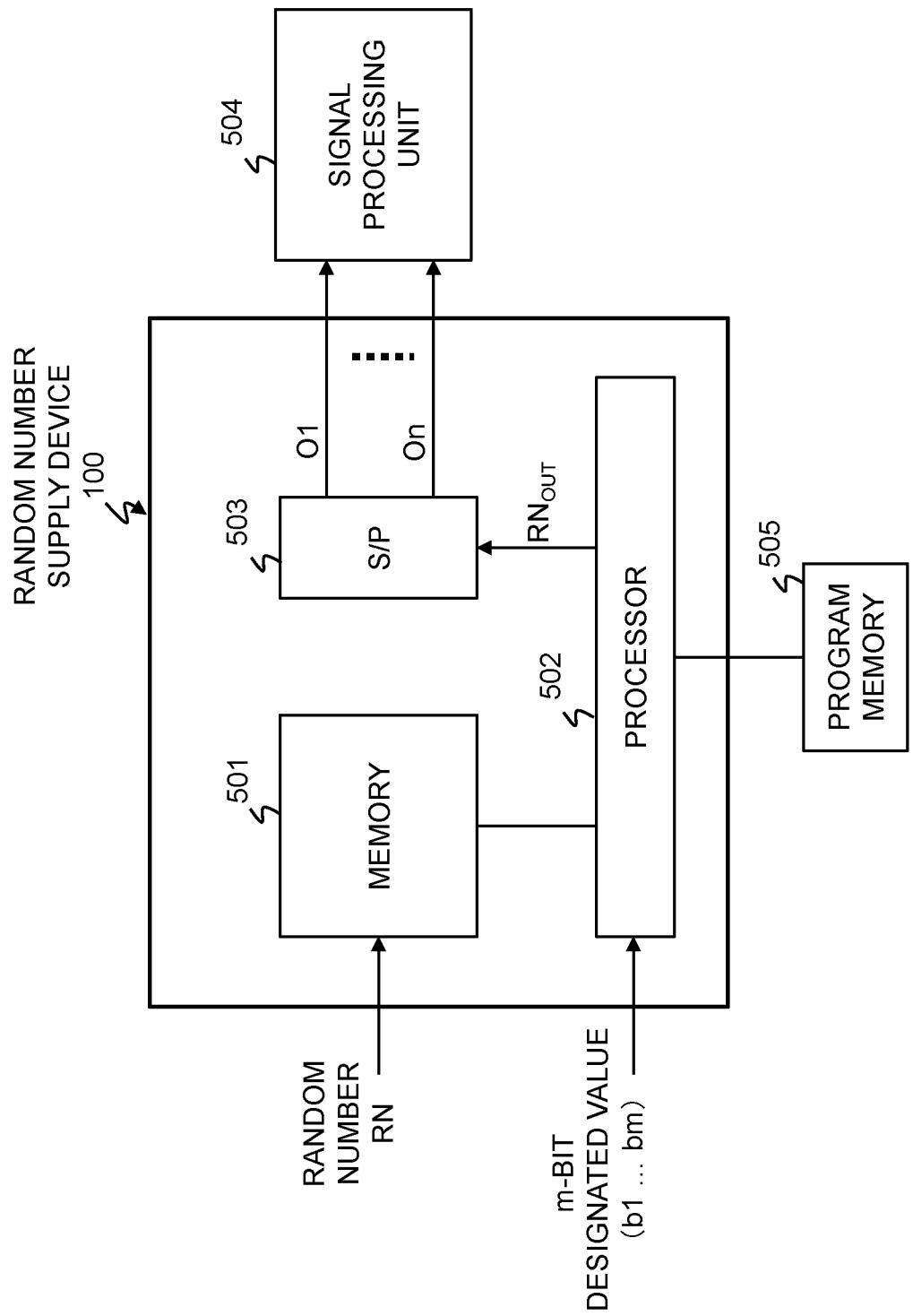
FIG. 6 is a block diagram illustrating a schematic configuration of a random number supplying device according to the third illustrative embodiment of the present invention.

As illustrated in FIG. 6, a random number supply device 100 according to the third illustrative embodiment inputs random numbers RN from one or more random number generators and stores them in a memory 501. The random number generator is preferably a hardware random number generator using thermal noise, photon detection, or the like. However, the present embodiment is applicable even to the case of a pseudo-random number generator. The memory 501 is subjected to read control by a processor 502 to generate n-bit random number $RN_{OUT}$ for identifying any one of designated states the number of which is greater than $2^{n-1}$ and smaller than $2^n$. The n-bit random number $RN_{OUT}$ may be output in series to the signal processing unit 504 as in the second illustrative embodiment. Alternatively, as illustrated in FIG. 6, the n-bit random number $RN_{OUT}$ may be output sequentially to a shift register 503, which outputs n-bit parallel output O1-On to the signal processing unit 504.

The processor 502 implements the random number supply function according to the present embodiment by executing programs read from a program memory 505. As described below, the processor 502 each time reading a random number RN from the memory 501, compares the random number RN with an m-bit designated value, and decides whether to use random numbers for the remaining bits. The random number supply operation in the present embodiment will be described below with reference to FIG. 7.

3.2) Random Number Supply Operation

Figure 7:
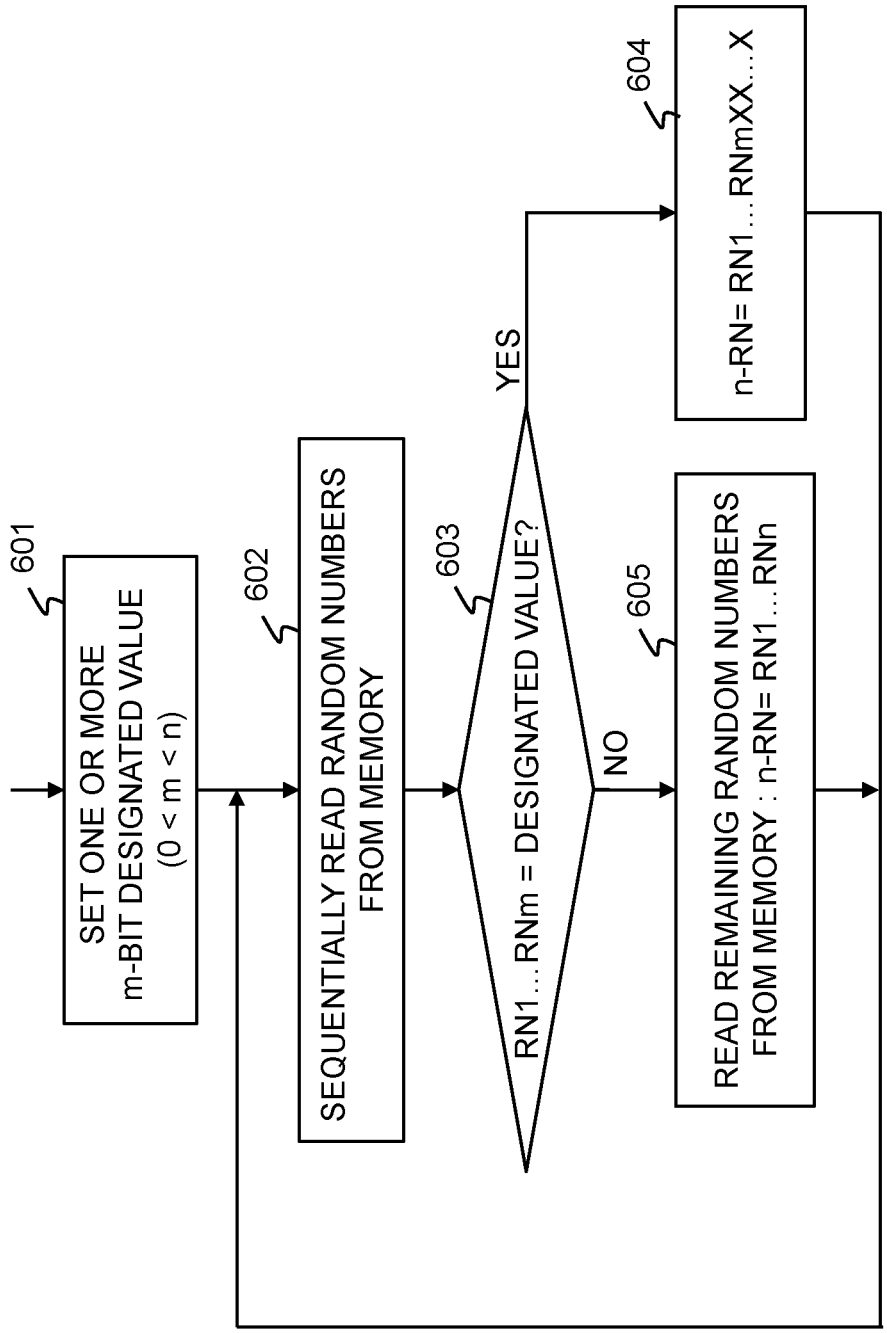
FIG. 7 is a flowchart illustrating operations of the random number supplying device according to the third illustrative embodiment of the present invention.

As illustrated in FIG. 7, the processor 502 sets one or more m-bit designated value (Operation 601). Then, the processor 502 sequentially reads random numbers RN from the memory 501 (Operation 602), and decides whether a read random number sequence "RN1 . . . RNm" matches the one or more m-bit designated value (Operation 603). If a match is found (YES in Operation 603), the processor 502 fills the (n-m) bits following the random number sequence "RN1 . . . RNm" with X indicating Don't Care, and outputs n-bit output n-RN="RN1 . . . RNmXX . . . X," to the signal processing unit 504 (Operation 604). If no match is found (NO in Operation 603), the processor 502 sequentially reads random numbers from the memory 501 and puts each read random number into a bit position from the mismatch bit position on down, thereby outputting n-bit output n-RN="RN1 . . . RNn" to the signal processing unit 504 (Operation 605). Note that the read random numbers are sequentially deleted from the memory 501.

As described above, according to the third illustrative embodiment of the present invention, if a random number sequence read from the memory 501 matches the designated value, the subsequent random numbers are not used, thus suppressing the consumption of random numbers.

4. EXAMPLE

According to an example of the present invention, a communication device will be described below, in which a random number supply device 100 according to the first to third illustrative embodiments described above supplies random numbers to an intensity modulator that modulates the intensity of optical pulses. The intensity modulator of the communication device corresponds to the signal processing unit 105, 303 or 504 in the first to third illustrative embodiments. In this example, the case where the intensity of an optical pulse is changed among three levels will be described. Therefore, the random number supply device 100 supplies the intensity modulator with three-state random number output O1 and O2 corresponding respectively to the three intensity levels.

Figure 8:
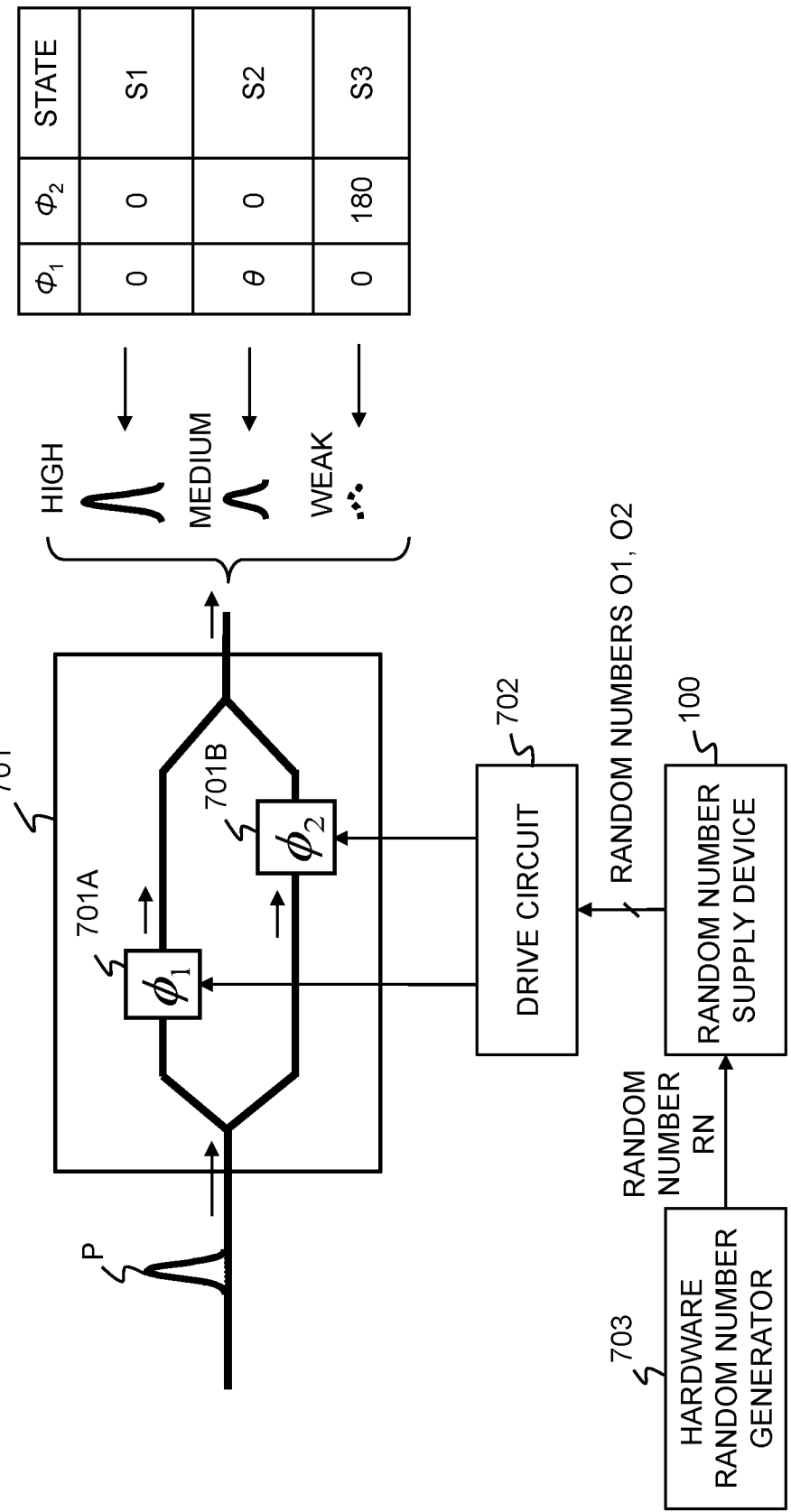
FIG. 8 is a block diagram illustrating an example of a communication device according to an example of the present invention.

Referring to FIG. 8, the intensity modulator of the communication device includes a dual-electrode intensity modulator 701 and a drive circuit 702. The random number supply device 100 inputs random number RN from a hardware random number generator 703 and supplies random numbers O1 and O2 indicating the three states to the drive circuit 702. Since the functions and operations of the random number supply device 100 are as described in the first to third illustrative embodiments above, detailed descriptions are omitted.

The dual-electrode intensity modulator 701 has a configuration such that phase shifters 701A and 701B are provided on respective ones of branched optical paths. The amounts of phase shift at the phase shifters 701A and 701B are determined depending on drive voltages supplied by the drive circuit 702, respectively. In the dual-electrode intensity modulator 701, a transmission optical pulse P is branched into two branched pulses, which are phase-shifted respectively by the phase shifters 701A and 701B before combined. By controlling the amounts of phase shift by the phase shifters 701A and 701B, the intensity of the combined pulse can be set at any one of the three levels. In FIG. 8, the combined pulse can be set at "High" intensity when the phase shift amount $\Phi_1$ of the phase shifter 701A and the phase shift amount $\Phi_2$ of the phase shifter 701B are (0, 0), at "Medium" intensity when ($\theta$, 0), and at "Weak" intensity when (0, 180°). Note that $0<\theta<180°$, where $\theta$ is the value at which the predetermined "Medium" intensity is obtained.

The drive circuit 702 varies the drive voltage applied to each electrode of the phase shifters 701A and 701B according to the state S1, S2 or S3 identified by the random numbers O1 and O2 supplied from the random number supply unit 100. As shown in FIG. 8, the phase shift amounts $\Phi_1$ and $\Phi_2$ are changed so that the intensity of the combined pulse becomes "High" when the random numbers O1 and O2 indicate the state S1, "Medium" when they indicate the state S2, and "Weak" when they indicate the state S3.

In the present example, the random number supply device 100 according to the first and second illustrative embodiments described above is used to generate three states for signal processing to change the intensity of optical pulses in three levels. Alternatively, the random number supply device according to the third illustrative embodiment may be applied to the case of a signal processing unit that is operable in any of states, the number of which is more than $2^{n-1}$ and less than $2^n$. For example, the random number supply device 100 with n=3 in the third illustrative embodiment may be employed in the case of a modulator that changes the phase or intensity of optical pulses in five levels.

The three-level intensity modulation may also be implemented by a configuration in which two intensity modulators each controlling the amount of phase shift are connected in series, in place of a dual-electrode intensity modulator 701. In addition, a dual-electrode Mach-Zehnder (MZ) modulator may be employed as the dual-electrode intensity modulator 701. An MZ modulator can perform both or one of intensity modulation and phase modulation for optical pulses by controlling drive voltages.

5. QKD SYSTEM

The first to third illustrative embodiments and the example as described above may be applied to random number supply in quantum key distribution (QKD) systems. In particular, a decoy method which is designed to vary the intensity of optical pulses is capable of detecting the presence or absence of a PNS attack. Accordingly, it is considered that the decoy system is essential for the practical application of QKD systems.

In decoy systems, it is common to use a 3-level intensity. The optical pulse of "High" intensity is used as signal, and information obtained from a sequence of such optical pulses is used as a quantum cryptographic key. On the other hand, the optical pulses of "Medium" and "Weak" intensities are used as decoy pulses to detect eavesdropping. In a QKD system using the decoy method, most of the transmission pulses are used as signal, and some are used as decoy pulses of "Medium" or "Weak" intensity.

Hereinafter, a unidirectional QKD system using the above example for decoy intensity modulation will be described below with reference to FIGS. 9-11. The above example can be applied not only to unidirectional but also to bidirectional QKD systems as well.

Figure 9:
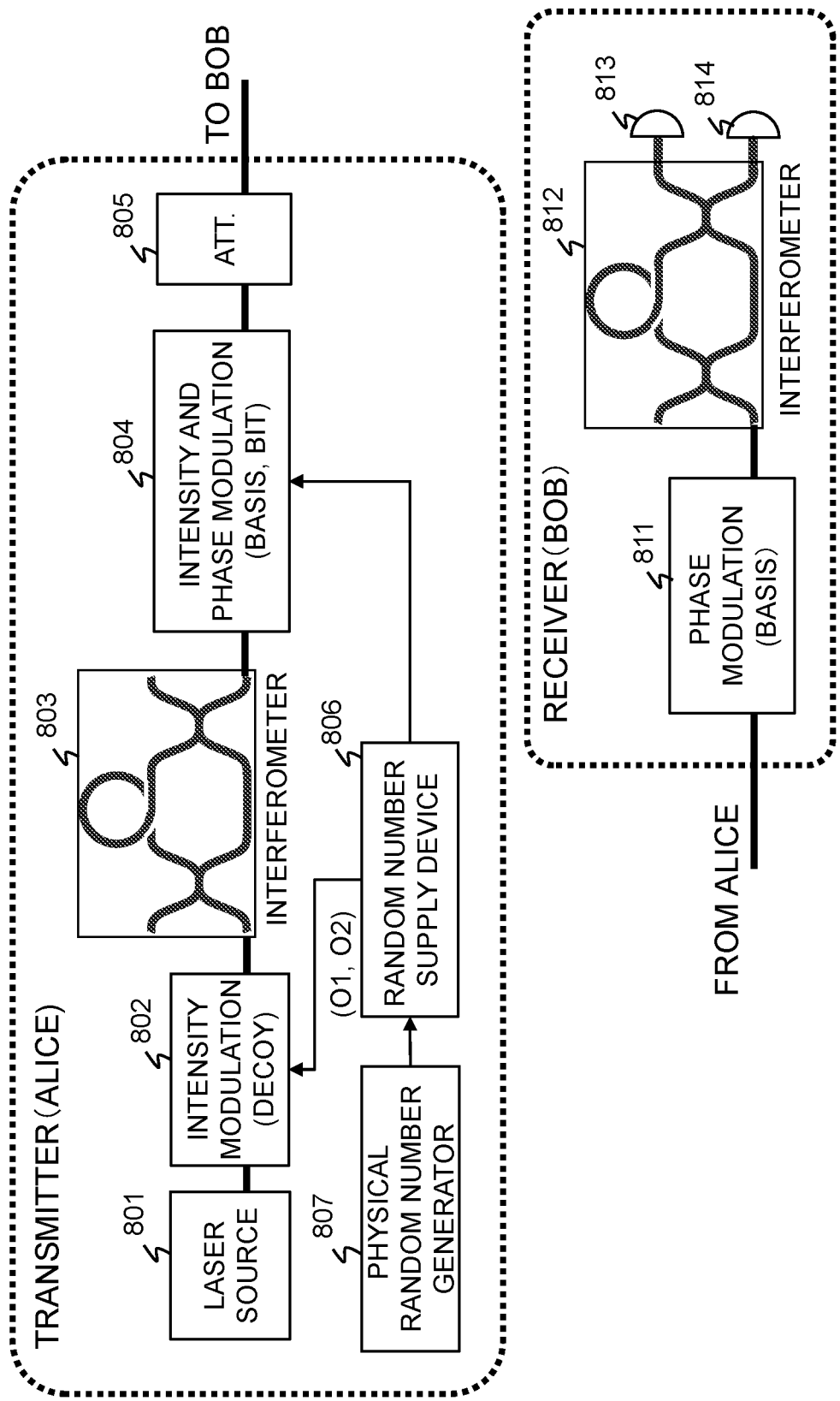
FIG. 9 is a system configuration diagram illustrating an example of a QKD system in which the communication device as shown in FIG. 8 is applied to a decoy QKD transmitter.
Figure 10:
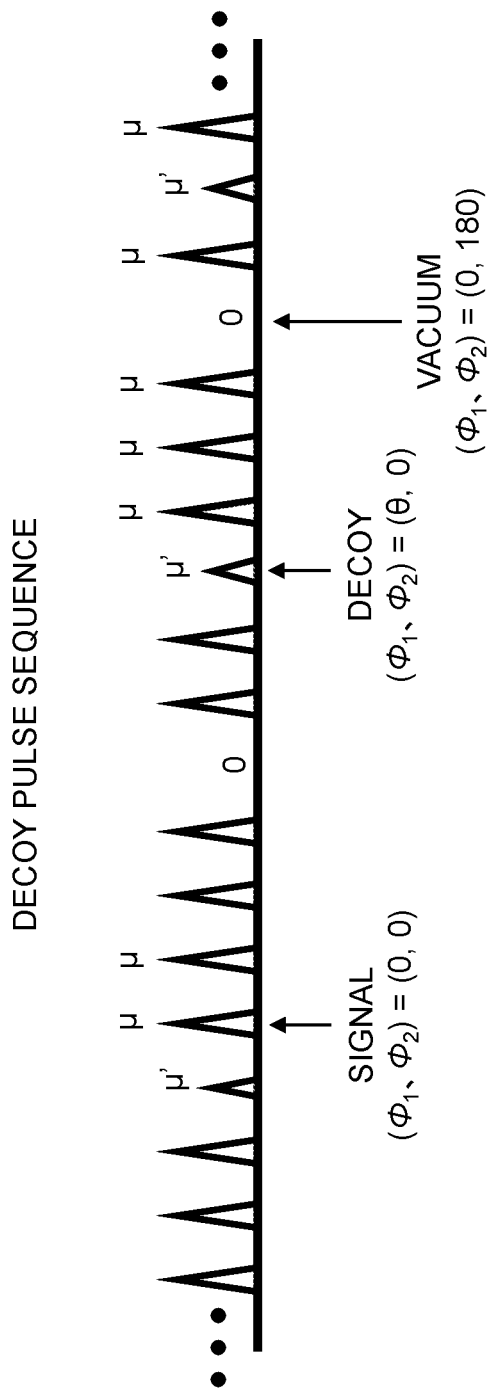
FIG. 10 is a schematic diagram of a decoy method illustrating an example of a decoy pulse sequence in the QKD system as shown in FIG. 9.

As illustrated in FIG. 9, a unidirectional QKD system includes a transmitter (Alice) and a receiver (Bob) connected by an optical fiber. Quantum keys can be distributed from Alice to Bob using various quantum key distribution algorithms.

Alice includes a laser source 801, an intensity modulator 802, an asymmetric interferometer 803, an intensity and phase modulator 804, an attenuator 805, a random number supply unit 806, a hardware random number generator 807, and other synchronization and control units (not shown). Bob includes a phase modulator 811, an asymmetric interferometer 812, photon detectors 813 and 814, and other synchronization and control units (not shown). Alice's asymmetric interferometer 803 and Bob's asymmetric interferometer 812 have the same configuration.

The random number supply unit 806 inputs random numbers from the hardware random number generator 807, outputs random numbers O1 and O2 for decoy to the intensity modulator 802, and outputs random numbers for basis and information bits to the intensity and phase modulator 804. The random numbers O1 and O2 for decoy represent three states and can be generated by the random number supply device according to the first to third illustrative embodiments or the example as described above. According to the above-mentioned embodiments and example of the present invention, the random numbers O1 and O2 representing the three states can suppress the consumption of hardware random numbers, compared to the case where two sequences of random numbers are used as they are.

In FIG. 9, an optical pulse sequence output from the laser source 801 is modulated in three levels of optical intensity (High, Medium, and Weak) by the intensity modulator 802 according to the random numbers O1 and O2. An example of a decoy pulse sequence is shown in FIG. 10. In the decoy pulse sequence, the "High" intensity pulse μ is used for signal and the "Medium" intensity pulse μ' is used for decoy.

Each optical pulse in the decoy pulse sequence is split in time into two pulses P1 and P2 (double pulse) by passing through the asymmetric interferometer 803. A double pulse sequence is phase-modulated by the intensity and phase modulator 804 according to random numbers for basis and information bits: 0 and π for binary phase; 0, π/2, π and 3π/2 for phase quadrature; and so on.

As an example, it is assumed that a double pulse DP1 of "High" intensity optical pulse μ is followed by a double pulse DP2 of "Medium" intensity optical pulse μ'. The intensity phase modulator 804 performs phase modulation ($\varphi_A$) on the leading pulse P1 of a double pulse DP1, and phase modulation ($\varphi_A$) on the leading pulse P1 of the subsequent double pulse DP2. The double pulses DP1, DP2 . . . are phase-modulated in this way and then sent out to Bob through the attenuator 805.

Bob's phase modulator 811 performs phase modulation ($\varphi_B$) on an arriving double pulse, for instance its trailing pulse P2, according to a random number for the basis. Accordingly, the leading pulse of the arriving double pulse has been phase modulated ($\varphi_A$) at Alice, and the trailing pulse thereof is phase modulated ($\varphi_B$) at Bob. Therefore, as this double pulse pass through the interferometer 812, the leading and trailing pulses interfere with each other, and the interference result is detected by the photon detectors 813 and 814. In other words, for each double pulse, information can be detected from the phase difference between the leading and trailing pulses. Furthermore, since the intensity is randomly varied for each double pulse by Alice's intensity modulator 802, PNS attacks can be detected by monitoring a statistical change in the number of received photons caused by a PNS attack.

Decoy pulses can be generated according to a specification as illustrated in FIG. 11. As an example, regarding the intensity of a pulse, a decoy pulse μ' is 0.4, and the weak pulse (vacuum) is 0 in reference to a signal pulse μ. In general, the mixing ratio in a decoy pulse sequence is 90% for signal pulse μ, 6% for decoy pulse μ', and 4% for vacuum.

6. SUPPLEMENTARY NOTES

The whole or part of the example embodiments disclosed above can be described as, but not limited to, the following supplementary notes.

(Supplementary Note 1)

A random number supply device that generates three states required for operation of a signal processing unit from two-bit random number, the device comprising:
  a decision section configured to decide whether a first random number matches a predetermined value, the first random number is generated by a first random number generator; and
  a control section configured to supply the signal processing unit with the two-bit random number including the first random number by not using a second random number generated by a second random number generator when the first random number matches the predetermined value, and by using the second random number when the first random number does not match the predetermined value.

(Supplementary Note 2)

The random number supply device according to supplementary note 1, wherein the control section is configured to:
  supply the signal processing unit with the first random number and an arbitrary value when the first random number matches the predetermined value; and
  supply the signal processing unit with the first random number and the second random number generated by the second random number generator when the first random number does not match the predetermined value.

(Supplementary Note 3)

The random number supply device according to supplementary note 1 or 2, further comprising a memory unit that stores second random numbers generated by the second random number generator, wherein the control section is configured to read the second random number from the memory unit when the first random number does not match the predetermined value.

(Supplementary Note 4)

The random number supply device according to any one of supplementary notes 1-3, wherein a random number generation rate of the second random number generator is lower than that of the first random number generator.

(Supplementary Note 5)

A random number supply device that supplies a n-bit random number to a signal processing unit that operates according to the n-bit random number (n is an integer equal to or greater than 2), the device comprising:
- a memory unit that stores random numbers generated by at least one random number generator;
- a decision section configured to decide whether at least one random number read from the memory unit matches at least one predetermined value; and
- a control section configured to: when the at least one random number matches the at least one predetermined value, supply the signal processing unit with n-bit random number consisting of the at least one random number and an arbitrary value stored at remaining bit positions following the at least one random number; and when the at least one random number does not match the at least one predetermined value, supply the signal processing unit with n-bit random number consisting of matched random numbers of the at least one random number and further random numbers read from the memory stored at bit positions from a mismatch bit position on down.

(Supplementary Note 6)

The random number supply device according to supplementary note 5, wherein the signal processing unit is controlled according to a number of states greater than $2^{n-1}$ but smaller than $2^n$ by 1 or more, wherein $2^n$ states are logically indicated by the n-bit random number.

(Supplementary Note 7)

The random number supply device according to supplementary note 5 or 6, wherein the decision section is configured to decide whether a first random number of one bit read from the memory unit matches one predetermined value; and
the control section is configured to: when the first random number matches the one predetermined value, supply the signal processing unit with the first random number and an arbitrary value; and when the first random number does not match the one predetermined value, read a second random number from the memory unit to supply the signal processing unit with the first random number and the second random number.

(Supplementary Note 8)

The random number supply device according to supplementary note 5 or 6, wherein the decision section is configured to decide whether a m-bit random number sequence read from the memory unit matches a plurality of m-bit predetermined values, wherein m is an integer and 0<m<n; and
the control section is configured to: when the m-bit random number sequence matches any one of the plurality of m-bit predetermined values, supply the signal processing unit with n-bit random number consisting of the m-bit random number sequence and an arbitrary value stored at remaining bit positions following the m-bit random number sequence; and when the m-bit random number sequence does not match any one of the plurality of m-bit predetermined values, supply the signal processing unit with n-bit random number consisting of matched random numbers of the m-bit random number sequence and further random numbers read from the memory stored at bit positions from a mismatch bit position on down.

(Supplementary Note 9)

The random number supply device according to any one of supplementary notes 1-8, wherein the signal processing unit is a modulator that performs modulation in at least one of intensity and phase of a transmission signal.

(Supplementary Note 10)

A communication device performs signal processing using random numbers supplied by the random number supply device according to any one of supplementary notes 1-9.

(Supplementary Note 11)

A communication device at transmitting side in a quantum key distribution (QKD) system, the communication device performing intensity modulation on transmission optical pulses according to random numbers supplied by the random number supply device according to any one of supplementary notes 1-9.

(Supplementary Note 12)

A random number supply method that generates three states required for operation of a signal processing unit from two-bit random number, the method comprising:
- by a decision section, deciding whether a first random number matches a predetermined value, the first random number is generated by a first random number generator; and
- by a control section, supplying the signal processing unit with the two-bit random number including the first random number by not using a second random number generated by a second random number generator when the first random number matches the predetermined value, and by using the second random number when the first random number does not match the predetermined value.

(Supplementary Note 13)

A random number supply method for supplying a n-bit random number to a signal processing unit that operates according to the n-bit random number (n is an integer equal to or greater than 2), the method comprising:
- storing random numbers generated by at least one random number generator in a memory unit;
- by a decision section, deciding whether at least one random number read from the memory unit matches at least one predetermined value; and
- by a control section,
  when the at least one random number matches the at least one predetermined value, supplying the signal processing unit with n-bit random number consisting of the at least one random number and an arbitrary value stored at remaining bit positions following the at least one random number; and
  when the at least one random number does not match the at least one predetermined value, supplying the signal processing unit with n-bit random number consisting of matched random numbers of the at least one random number and further random numbers read from the memory stored at bit positions from a mismatch bit position on down.

(Supplementary Note 14)

The random number supply method according to supplementary note 13, wherein the signal processing unit is controlled according to a number of states greater than $2^{n-1}$ but smaller than $2^n$ by 1 or more, wherein $2^n$ states are logically indicated by the n-bit random number.

(Supplementary Note 15)

The random number supply method according to supplementary note 13 or 14, wherein by the decision section, it is decided whether a first random number of one bit read from the memory unit matches one predetermined value; and by the control section,
  when the first random number matches the one predetermined value, the signal processing unit is supplied with the first random number and an arbitrary value; and
  when the first random number does not match the one predetermined value, a second random number is read from the memory unit to supply the signal processing unit with the first random number and the second random number.

(Supplementary Note 16)

The random number supply method according to supplementary note 13 or 14, wherein by the decision section, it is decided whether a m-bit random number sequence read from the memory unit matches a plurality of m-bit predetermined values, wherein m is an integer and 0<m<n; and
by the control section,
  when the m-bit random number sequence matches any one of the plurality of m-bit predetermined values, the signal processing unit is supplied with n-bit random number consisting of the m-bit random number sequence and an arbitrary value stored at remaining bit positions following the m-bit random number sequence; and
  when the m-bit random number sequence does not match any one of the plurality of m-bit predetermined values, the signal processing unit is supplied with n-bit random number consisting of matched random numbers of the m-bit random number sequence and further random numbers read from the memory stored at bit positions from a mismatch bit position on down.

(Supplementary Note 17)

The random number supply method according to any one of supplementary notes 13-16, wherein the signal processing unit is a modulator that performs modulation in at least one of intensity and phase of a transmission signal.

(Supplementary Note 18)

A communication device at transmitting side in a quantum key distribution (QKD) system, comprising:
  a decoy intensity modulator that performs intensity modulation on optical pulses according to random numbers;
  a decision section configured to decide whether a first random number matches a predetermined value, the first random number is generated by a first random number generator; and
  a control section configured to: supply the decoy intensity modulator with the first random number and an arbitrary value when the first random number matches the predetermined value; and supply the decoy intensity modulator with the first random number and a second random number generated by a second random number generator when the first random number does not match the predetermined value.

(Supplementary Note 19)

A communication device at transmitting side in a quantum key distribution (QKD) system, comprising:
  a decoy intensity modulator that performs intensity modulation on optical pulses according to random numbers;
  a memory unit that stores random numbers generated by at least one random number generator;
  a decision section configured to decide whether a first random number read from the memory unit matches the predetermined value; and
  a control section configured to: when the first random number matches the predetermined value, supply the decoy intensity modulator with the first random number and an arbitrary value; and when the first random number does not match the predetermined value, read a second random number from the memory unit to supply the decoy intensity modulator with the first random number and the second random number.

(Supplementary Note 20)

A program for functioning a computer as a device for supplying a random number to a signal processing unit that operates according to the random numbers, the program implementing functions of:
  deciding whether a first random number matches a predetermined value, the first random number is generated by a first random number generator; and
  supplying the signal processing unit with the two-bit random number including the first random number by not using a second random number generated by a second random number generator when the first random number matches the predetermined value, and by using the second random number when the first random number does not match the predetermined value.

(Supplementary Note 21)

A program for functioning a computer as a device for supplying n-bit (n is an integer equal to or greater than 2) random number to a signal processing unit that operates according to the n-bit random numbers, the program implementing functions of:
  storing random numbers generated by at least one random number generator in a memory unit;
  deciding whether at least one random number read from the memory unit matches at least one predetermined value; and
  when the at least one random number matches the at least one predetermined value, supplying the signal processing unit with n-bit random number consisting of the at least one random number and an arbitrary value stored at remaining bit positions following the at least one random number; and when the at least one random number does not match the at least one predetermined value, supplying the signal processing unit with n-bit random number consisting of matched random numbers of the at least one random number and further random numbers read from the memory stored at bit positions from a mismatch bit position on down.

INDUSTRIAL APPLICABILITY

The present invention is generally applicable to random number supply devices such as information processing devices and communication devices that need random numbers for signal processing.

EXPLANATION OF SIGNS

100 Random number supply device
101, 102 Random number generator
103 Decision section
104 Memory
105 Signal processing unit
301 Random number pool
302 Decision section
303 Signal processing unit
501 Memory
502 Processor
503 Shift register
504 Signal processing unit
505 Program memory
701 Dual-electrode intensity modulator 701A, 701B Phase shifter
702 Drive circuit
703 Hardware random number generator
801 Laser source
802 Intensity modulator (Decoy)
803 Asymmetric interferometer
804 Intensity and phase modulator
805 Attenuator
806 Random number supply unit
807 Hardware random number generator
811 Phase modulator (Basis)
812 Asymmetric interferometer
813, 814 Photon detector

What is claimed is:

1. A random number supply device that inputs a first random number from a first random number generator to generate a two-bit random number, comprising:
   program memory storing instructions;
   memory that stores a second random number generated by a second random number generator; and
   at least one hardware processor configured to process the instructions to:
      decide whether the first random number is equal to a predetermined value;
      generate the two-bit random number including the first random number by not reading the second random number from the memory when the first random number is equal to the predetermined value, and by reading the second random number from the memory when the first random number is not equal to the predetermined value; and
      supply the two-bit random number to a modulator that performs modulation in at least one of intensity and phase of a transmission signal based on the two-bit random number.

2. The random number supply device according to claim 1, wherein the at least one hardware processor is configured to:
   generate the two-bit random number consisting of the first random number and an arbitrary value when the first random number is equal to the predetermined value; and
   generate the two-bit random number consisting of the first random number and the second random number read from the memory when the first random number is not equal to the predetermined value.

3. The random number supply device according to claim 1, wherein a random number generation rate of the second random number generator is lower than that of the first random number generator.

4. A random number supply device comprising:
   memory that stores random numbers generated by at least one random number generator; and
   at least one processor configured to:
      decide whether at least one random number read from the memory is equal to at least one predetermined value;
      when the at least one random number is equal to the at least one predetermined value, supply a signal processing unit with n-bit random number consisting of the at least one random number and an arbitrary value stored at remaining bit positions following the at least one random number, wherein n is an integer equal to or greater than 2; and
      when the at least one random number is not equal to the at least one predetermined value, supply the signal processing unit with n-bit random number consisting of matched random numbers of the at least one random number and further random numbers read from the memory stored at bit positions from a mismatch bit position on down,
   wherein the signal processing unit is a modulator that performs modulation in at least one of intensity and phase of a transmission signal based on the n-bit random number.

5. The random number supply device according to claim 4, wherein the signal processing unit is controlled according to a number of states greater than $2^{n-1}$ but smaller than $2^n$ by 1 or more, wherein $2^n$ states are logically indicated by the n-bit random number.

6. The random number supply device according to claim 4, wherein the at least one processor is configured to:
   decide whether a first random number of one bit read from the memory is equal to one predetermined value;
   when the first random number is equal to the one predetermined value, supply the signal processing unit with the first random number and the arbitrary value; and
   when the first random number is not equal to the one predetermined value, read a second random number from the memory to supply the signal processing unit with the first random number and the second random number.

7. The random number supply device according to claim 4, wherein the at least one processor is configured to:
   decide whether a m-bit random number sequence read from the memory is equal to a plurality of m-bit predetermined values, wherein m is an integer and $0<m<n$;
   when the m-bit random number sequence is equal to any one of the plurality of m-bit predetermined values, supply the signal processing unit with the n-bit random number consisting of the m-bit random number sequence and the arbitrary value stored at remaining bit positions following the m-bit random number sequence; and
   when the m-bit random number sequence is not equal to any one of the plurality of m-bit predetermined values, supply the signal processing unit with the n-bit random number consisting of the matched random numbers of the m-bit random number sequence and further random numbers read from the memory stored at bit positions from the mismatch bit position on down.

8. A transmitter in a decoy quantum key distribution (QKD) system, comprising the random number supply device according to claim 4.

9. A random number supply method comprising:
   storing random numbers generated by at least one random number generator in a memory;
   by at least one processor:
      deciding whether at least one random number read from the memory is equal to at least one predetermined value; and
      when the at least one random number is equal to the at least one predetermined value, supplying a signal processing unit with n-bit random number consisting of the at least one random number and an arbitrary value stored at remaining bit positions following the at least one random number, wherein n is an integer equal to or greater than 2; and
      when the at least one random number is not equal to the at least one predetermined value, supplying the signal processing unit with n-bit random number consisting of matched random numbers of the at least one random number and further random numbers read from the memory stored at bit positions from a mismatch bit position on down, wherein the signal processing unit is a modulator that performs modulation in at least one of intensity and phase of a transmission signal based on the n-bit random number.

10. The random number supply method according to claim 9, wherein the signal processing unit is controlled according to a number of states greater than $2^{n-1}$ but smaller than $2^n$ by 1 or more, wherein $2^n$ states are logically indicated by the n-bit random number.

11. The random number supply method according to claim 9, wherein the at least one processor is configured to:
    decide whether a first random number of one bit read from the memory is equal to one predetermined value; and
    when the first random number is equal to the one predetermined value, supply the signal processing unit with the first random number and the arbitrary value; and
    when the first random number is not equal to the one predetermined value, read a second random number from the memory to supply the signal processing unit with the first random number and the second random number.

12. The random number supply method according to claim 9, wherein the at least one processor is configured to:
    decide whether a m-bit random number sequence read from the memory is equal to a plurality of m-bit predetermined values, wherein m is an integer and $0<m<n$; and
    when the m-bit random number sequence is equal to any one of the plurality of m-bit predetermined values, supply the signal processing unit with the n-bit random number consisting of the m-bit random number sequence and the arbitrary value stored at remaining bit positions following the m-bit random number sequence; and
    when the m-bit random number sequence is not equal to any one of the plurality of m-bit predetermined values, supply the signal processing unit with the n-bit random number consisting of the matched random numbers of the m-bit random number sequence and further random numbers read from the memory stored at bit positions from the mismatch bit position on down.

* * * * *